Nov. 3, 1964   D. H. SHOWLER   3,155,257
BOAT LOADING DEVICE
Filed April 8, 1963   2 Sheets-Sheet 2
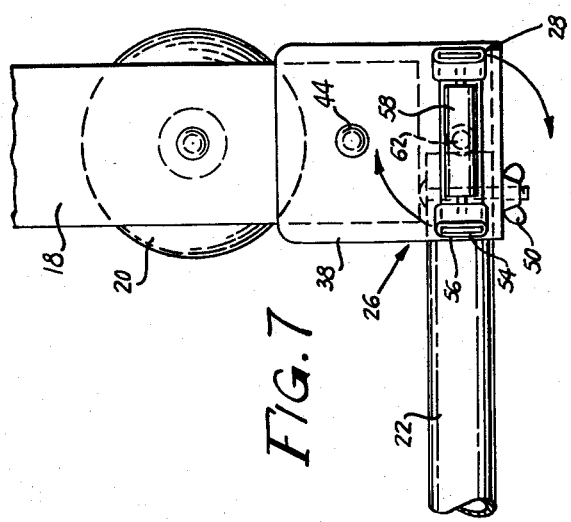
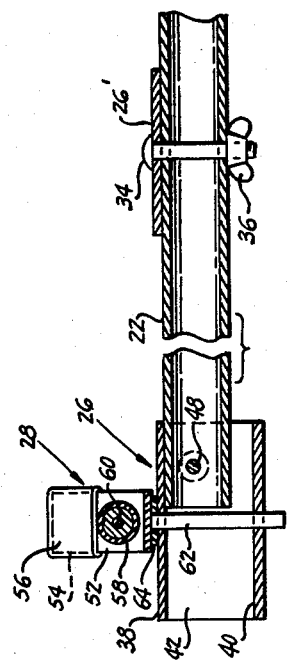
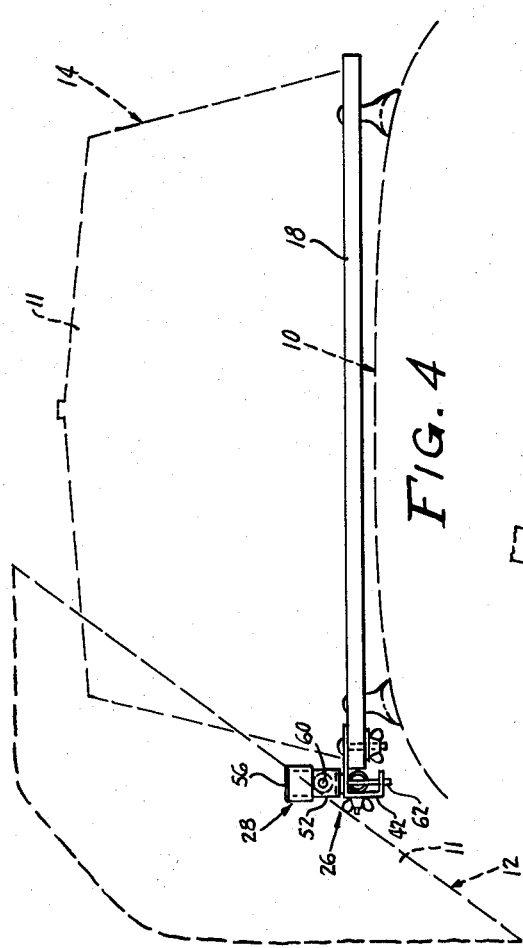
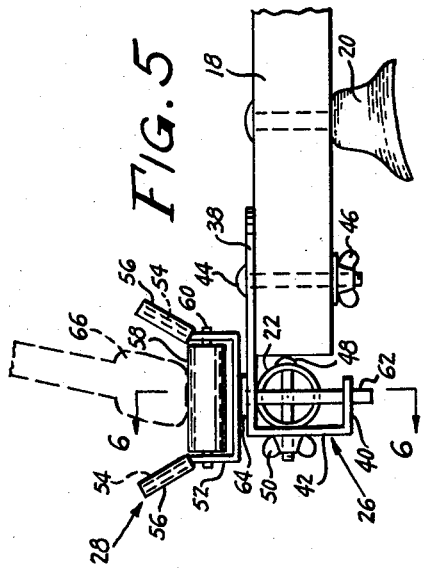
INVENTOR.
DONALD H. SHOWLER
BY
Kimmel & Crowell
ATTORNEYS.

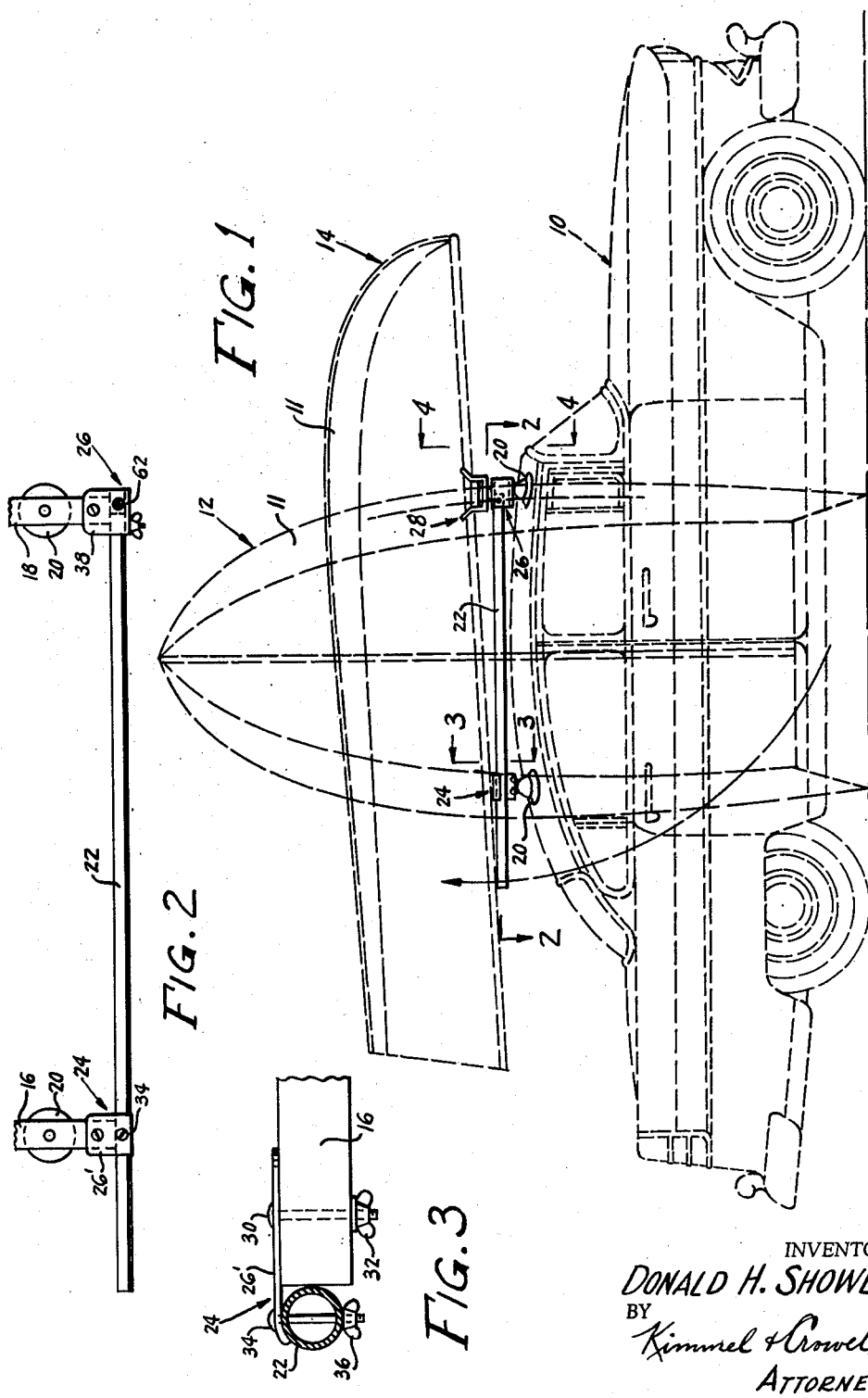

United States Patent Office 3,155,257
Patented Nov. 3, 1964

3,155,257
BOAT LOADING DEVICE
Donald H. Showler, 5408 Ben Court,
Sacramento 21, Calif.
Filed Apr. 8, 1963, Ser. No. 271,325
10 Claims. (Cl. 214—450)

This invention relates to a boat loading device and relates more particularly to a device for loading a boat or the like onto the top of an automobile having secured thereto a conventional carrier or rack.

A primary object of this invention is to provide a device whereby a boat or other such heavy, bulky objects may be loaded and unloaded onto the top of an automobile by a single individual.

Another object of this invention is the provision of a boat loading device which is readily attachable to, and detachable from, a conventional carrier or rack of any design regardless of the shape or dimensions of the transverse bars forming an integral part thereof.

A further object of this invention is to provide such a device whereby an individual may easily and efficiently load and unload a boat or the like onto a carrier secured to an automobile without the possibility of damaging the automobile during the loading or unloading operation.

A still further object of this invention is the provision of means whereby a boat of any width may be loaded and unloaded from such a carrier by simply varying the length of one of the elements without necessitating a change of the basic construction.

Another object of the instant invention is to provide a device wherein the one element, that requires substantial space may be handled separately allowing the remainder of the device to be easily, economically and compactly packaged and therefore inexpensively shipped.

A further object of this invention is the provision of a device of the character described which is easily assembled and readily dissembled by the user.

A still further object of the instant invention is the provision of an improved boat loading device which is sturdy and durable in construction, reliable and efficient in operation, and relatively simple and inexpensive to manufacture, assemble, utilize and maintain.

Other and further objects reside in the combination of elements, arrangements of parts and features of construction.

Still other objects will in part be obvious and in part be pointed out as the description of the invention proceeds and as shown in the accompanying drawings wherein:

FIGURE 1 is a front elevational view of the device of the instant invention, with an automobile being shown in dotted lines and with a boat in both the lifting and carrying positions also being shown in dotted lines;

FIGURE 2 is an enlarged cross-sectional plan view taken substantially on line 2—2 of FIGURE 1, with parts broken away for illustrative convenience;

FIGURE 3 is an enlarged fragmentary elevational cross-sectional view taken substantially on line 3—3 of FIGURE 1;

FIGURE 4 is an end elevational view taken substantially on line 4—4 of FIGURE 1 and showing a portion of the automobile in dotted lines and a portion of the boat in both the lifting and carrying positions also in dotted lines;

FIGURE 5 is an enlarged end elevational view of the device of the instant invention similar to FIGURE 4, but showing the fulcrum means swiveled to the carrying position, with a portion of the boat being shown in dotted lines and with parts broken away for illustrative convenience;

FIGURE 6 is an enlarged fragmentary elevational cross-sectional view taken substantially on line 6—6 of FIGURE 5; and FIGURE 7 is an enlarged fragmentary top plan view showing the fulcrum means in detail.

Like reference characters refer to like parts throughout the several view of the drawings.

Referring now to the drawings in general and more particularly to FIGURE 1, an automobile is shown in dotted lines and is designated by the reference numeral 10 and a boat 11 is shown in dotted lines in the lifting position at 12 and in the carrying position at 14. Secured to the roof of the automobile 10 in any well-known manner is a conventional carrier or rack having a rear transverse bar 16 and a front transverse bar 18 each possessing cantilivered ends. As shown in the drawings each of the transverse bars is supported by suction cups 20 which engage the roof of the automobile 10 to prevent movement of the carrier. Any other securing means such as nuts and bolts or adjustable straps may be used as is well known in the art. It is to be understod that the device of the instant invention is designed for use with any conventional carrier or rack, one such well-known construction being shown in the drawings as illustrative. One of the major advantages of the boat loading device set forth herein is its flexibility and utility regardless of the particular construction of the carrier or rack and not requiring any substantial modifications of the existing rack.

The boat loading device of the instant invention comprises basically a longitudinal bar 22, a rear securing means 24 for detachably securing the longitudinal bar 22 to the cantilivered end of the rear transverse member 16, a front securing means 26 for detachably securing the longitudinal bar 22 to the front transverse member 18, and a fulcrum means 28 for slidingly receiving a portion of the object to be carried at right angles to the axis of the longitudinal bar 22 and for pivoting the same to a position parallel to the axis of the longitudinal bar and thus supported by the carrier or rack.

The longitudinal bar 22 may be of any configuration and is shown in the drawings as a relatively thin-walled tubular member. The length of the longitudinal bar 22 will depend upon the object to be carried such as the width of the boat and may be varied at will. While it is necessary to provide a longitudinal bar in order for the device of the instant invention to function as contemplated, it is to be understood that the other components of the device may be packaged and shipped as a unit with the consumer or user providing any bar which he has available, regardless of the configuration so long as it will fit within the dimensions of the other elements. As pointed out in the objects, this greatly facilitates packaging and reduces the cost of shipping.

The rear securing means 24 is basically comprised of a flat plate 26′ having spaced apertures therein. An aperture is defined in the rear end of the longitudinal bar 22 and in the rear transverse member 16. A bolt 30 is receivable through one of the apertures in the plate 26′ and the aperture in the transverse member 16 and a wing nut or the like 32 threadably secures the plate 26′ to the rear transverse member 16. A bolt 34 is receivable through the other aperture in the plate 26′ and through the aperture in the longitudinal bar 22 and a wing nut or the like 32 threadably secures the plate 26′ to the longintudinal bar 22. A plurality of longitudinally spaced apertures (not shown) may be provided adjacent the rear end of the longitudinal bar 22 to accommodate variable distances between the cantilevered ends of the rear and front transverse members 16 and 18, respectively, of the carrier.

The front securing means 26 is basically comprised of a plate having an upper elongated flange 38, a spaced parallel lower flange 40 and a vertically extending connecting member 42. An aperture is defined in the upper flange 38 and is aligned with an aperture in the front transverse member 18 to receive a bolt 44 to which a wing nut or the like 46 may be detachably affixed to secure the plate and the cantilevered end of the front transverse bar 18. An aperture may also be defined in the connecting member 42 and aligned with an aperture through the front end of the longitudinal bar 22 to receive a bolt 48 which is detachably affixed by a wing nut or the like 50 to secure the longitudinal bar 22 to the plate.

It is to be understood that any conventional means may be used in place of the nuts and bolts described so long as the same are readily detachable to facilitate assembly and dissembly of the user.

The fulcrum means 28 is basically comprised of a block U-shaped member 52 (note particularly FIGURE 5) the extremities of which terminate in upwardly and outwardly extending arm member 54 which may be encased in a relatively soft flexible material such as rubber, plastic or the like shown at 56 to avoid damage to the boat. A roller 58, covered with plastic, rubber, or the like, is rotatably mounted on a pin 60 extending between the vertical portions of the U-shaped member 52 at the lower end of the arm member 54. A pivot pin 62 is secured in any conventional manner as by welding or the like to the bottom of the U-shaped member 52 and passes through a washer 64 and vertically aligned apertures in the upper and lower flanges 38 and 40, respectively, of the front securing means 26. It will be noted that the fulcrum means 28 may be swiveled or pivoted from a first position as shown in FIGURE 7 whereby it will slidably receive a portion of the object to be loaded at right angles to the axis of the longitudinal bar 22 and a second position as shown in FIGURE 5 whereby it will pivot the object to a position substantially parallel to the axis of the longitudinal bar 22.

The use and operation of the device of the instant invention will now be apparent. The boat 11 will be set in the loading position shown at 12 in FIGURE 1 with its transom or rear portion resting on the ground and with one of its gunwales shown in dotted lines at 66 in FIGURE 5 positioned over the roller 58 of the fulcrum means 28. A single person may then lift the transom end of the boat 11 while resting the one gunwale 66 on the roller and slide the same upwardly until it is substantially balanced on the fulcrum means 28. The boat can then be readily pivoted to the carrying position 14 by lifting the transom end up and moving it toward the rear of the automobile 10 in order to swivel the fulcrum means 28. The transom end of the boat 11 is then placed over the rear transverse member 16 to support the same. The bow or front of the boat 11 may be left in the slightly raised position shown in FIGURE 1 with its gunwale 66 resting in the fulcrum means 28 or more preferably it may be simply lifted over the arm member 54 until the two gunwales are resting in supporting relationship on both the rear and the front transverse members 16 and 18, respectively, of the carrier or rack. Any conventional holding means such as ropes, straps or the like (not shown) may then be secured over the boat 11 to insure its stability during transportation.

To unload the boat 11 the aforementioned procedure is simply reversed. That is, the gunwale 66 is lifted until it is supported by the roller 58 of the fulcrum means 28. The transom end of the boat 11 is then lifted from the carrier and swung on its pivotal support on the fulcrum means 28 until it is disposed substantially transversely of the automobile 10. Then the boat 11 can be lowered to the ground in the position designated as 12 in FIGURE 1 by sliding the gunwale 66 over the roller 58.

The longitudinal bar 22 is so dimensioned that its length exceeds the width of the boat or the like being lifted. The rear end of the longitudinal bar 22 will then function to protect the automobile 10 from damage caused by leaving the boat 11 in the position 12 shown in FIGURE 1 or by resting the boat 11 in its transverse position during the lifting procedure. Normally, during loading and unloading the boat 11 is tilted toward the fulcrum means 28 so that the main contact is the sliding relationship between the gunwale 66 and the roller 58.

It is to be understood that although the major references herein have been directed to the loading and unloading of a boat, the device of the instant invention may be readily modified for use with other relatively heavy and cumbersome objects.

Thus, it can be seen that there is herein provided a device for loading a boat or the like on the top of an automobile which is easily operated by a single individual and which satisfies all of the objectives of the instant invention and others, including many advantages of great practical utility and commercial importance.

Since many embodiments may be made of this inventive concept and since many modifications may be made of the embodiments hereinbefore shown and described, it is to be understood that all matter herein is to be interpreted merely as illustrative and not in a limiting sense.

I claim:

1. Auxiliary structure adapting a load carrier secured to the top of an automobile, so as to be particularly suitable for loading and carrying a gunwaled boat thereon,
    said carrier including a single front and a single rear parallel transverse member, each with horizontally outstanding cantilevered ends,
    said auxiliary structure comprising a substantially straight longitudinal bar oriented substantially perpendicular to each of said transverse members and having front and rear portions,
    front securing means for detachably securing said front portion of said longitudinal bar to the cantilevered end of said front transverse member,
    rear securing means for detachably securing said rear portion of said longitudinal bar to a contilevered end of said rear transverse member,
    and an open top vertical axis swivelling guide and support fulcrum means fixedly mounted from above on and through one of said securing means, and of a horizontal dimension only slightly longer than the width of one gunwale,
    whereby said fulcrum means can slidably receive one boat gunwale when the latter is in a first position at right angles to the axis of said longitudinal bar, and guide and support the one gunwale when the latter is swivelled about the fulcrum means to a second position parallel to the axis of said longitudinal bar,
    and whereby the longitudinal bar can simultaneously support the other gunwale from a similar first position towards a similar second position, thus protecting the automobile top from damage during the positioning of the boat.

2. A device in accordance with claim 1 wherein said fulcrum means includes a short horizontal axis rotatably supporting roller to support said one gunwale.

3. A device in accordance with claim 1 wherein said fulcrum means includes a block U-shaped member with spaced apart arms having vertical lower portions and upwardly and slightly outwardly directed upper portions,
    a rotatable roller supported by and horizontally extending between said lower arm portions,
    and a downwardly directed pivot pin fixed to the base of the U member midway between said arms and extending from above through one of said securing means.

4. A device in accordance with claim 3 wherein each upper portion of said arm members is covered with a relatively soft flexible material to prevent damage to said boat gunwale.

5. A device in accordance with claim 4, wherein said rotatable roller has a soft cover.

6. A carrier for the top of a car for accommodating an inverted boat having a pair of gunwales,
comprising substantially horizontal front and rear transverse bars oriented perpendicularly to the longitudinal axis of the car,
means inward of the ends of each transverse bar to secure them at selective positions to the top of the car,
at least one longitudinal bar oriented parallel to the longitudinal axis of the car and having front and rear portions,
front securing means for detachably securing said front portion of said longitudinal bar to an end of said front transverse bar,
rear securing means for detachably securing selected points along said rear portion of said longitudinal bar to an end of said rear transverse bar,
and open top fulcrum means for a single boat gunwale, pivotally oriented about a fixed vertical axis and mounted from above, upon and through a front securing means.

7. A device in accordance with claim 6 wherein said rear securing means includes a rear securing plate having spaced apertures defined therein, an aperture defined in said rear transverse member and a plurality of apertures at said selected points defined in said rear end of said longitudinal bar, first nut and bolt means receivable through one of said apertures in said rear securing plate and said aperture in said rear transverse member to secure said plate to said rear transverse member and second nut and bolt means receivable through another of said apertures in said rear securing plate and one of said apertures in said longitudinal bar to secure said plate to said longitudinal bar.

8. A device in accordance with claim 6 wherein said front securing means includes a front securing plate having spaced apertures defined therein, an aperture defined in said front transverse member and at least one aperture defined in said front end of said longitudinal bar, first nut and bolt means receivable through one of said apertures in said front securing plate and said aperture in said front transverse member to secure said plate to said front transveres member and second nut and bolt means receivable through another of said apertures in said front securing plate and said aperture in said longitudinal bar to secure said plate to said longitudinal bar.

9. A device in accordance with claim 8 wherein said front securing plate includes an elongated upper flange, a spaced parallel lower flange and a connecting member therebetween.

10. A device in accordance with claim 9 wherein said aperture in said front securing plate receiving said first nut and bolt means is in said upper flange and said aperture in said front securing plate receiving said second nut and bolt means is in said connecting member.

References Cited in the file of this patent
UNITED STATES PATENTS

| | | |
|---|---|---|
| 2,765,180 | Albers | Oct. 2, 1956 |
| 2,812,087 | Zoller | Nov. 5, 1957 |
| 2,834,491 | Wells | May 13, 1958 |
| 3,039,634 | Hobson et al. | June 19, 1962 |
| 3,042,240 | Cline | July 3, 1962 |